US008608110B2

(12) United States Patent
Helou, Jr.

(10) Patent No.: US 8,608,110 B2
(45) Date of Patent: Dec. 17, 2013

(54) CARGO AIRCRAFT SYSTEM

(75) Inventor: Elie Helou, Jr., Carpenteria, CA (US)

(73) Assignee: Biosphere Aerospace, LLC, Carpinteria, CA (US)

( * ) Notice: Subject to any disclaimer, the term of this patent is extended or adjusted under 35 U.S.C. 154(b) by 572 days.

(21) Appl. No.: 12/833,868

(22) Filed: Jul. 9, 2010

(65) Prior Publication Data
US 2010/0276538 A1  Nov. 4, 2010

Related U.S. Application Data

(60) Continuation-in-part of application No. 12/636,381, filed on Dec. 11, 2009, now abandoned, which is a division of application No. 11/782,850, filed on Jul. 25, 2007, now Pat. No. 7,699,267, which is a division of application No. 10/996,799, filed on Nov. 23, 2004, now Pat. No. 7,261,257.

(51) Int. Cl.
*B64C 1/22* (2006.01)

(52) U.S. Cl.
USPC .................................. 244/137.1; 244/118.1

(58) Field of Classification Search
USPC ............. 244/118.2, 119, 120, 129.4, 129.5, 244/137.3, 137.1
See application file for complete search history.

(56) References Cited

U.S. PATENT DOCUMENTS

| | | | |
|---|---|---|---|
| 2,053,969 A | 9/1936 | Olds | 220/1.5 |
| 2,095,440 A | 10/1937 | Hojnowski | 244/118.1 |
| 2,387,527 A | 10/1945 | Nagamatsu | 244/118 |
| 2,388,380 A | 11/1945 | Bathurst | 244/118.2 |
| 2,407,724 A | 9/1946 | Fowler | 244/118 |
| 2,407,774 A | 9/1946 | Fowler | 244/118.2 |
| 2,425,499 A | 8/1947 | Watter | 244/118.3 |
| 2,425,972 A | 8/1947 | Watter | 244/118.3 |
| 2,446,441 A | 8/1948 | Taylor | 244/137 |
| 2,876,969 A | 3/1959 | Tydon et al. | 244/118.3 |
| 2,931,681 A | 4/1960 | Keller | 254/2 R |
| 3,009,672 A | 11/1961 | Tharratt | 244/137.1 |
| 3,028,130 A | 4/1962 | Burton | 244/137.1 |
| 3,055,620 A | 9/1962 | Weiland | 244/135 A |
| 3,147,942 A | 9/1964 | Griffith | 244/118.3 |
| 3,150,849 A | 9/1964 | Graham et al. | 244/100 R |
| 3,209,929 A | 10/1965 | Petersen | 414/676 |
| 3,289,981 A | 12/1966 | Meyer | 244/137.2 |
| 3,368,838 A | 2/1968 | Reich | 294/82.24 |
| 3,381,921 A | 5/1968 | McDonough | 410/79 |
| 3,419,164 A | 12/1968 | O'Neill | 414/345 |
| 3,691,595 A | 9/1972 | Backteman et al. | 24/287 |
| 3,872,555 A | 3/1975 | Link et al. | 24/590.1 |

(Continued)

OTHER PUBLICATIONS

U.S. Appl. No. 12/846,627, filed Jul. 29, 2010, Helou.

*Primary Examiner* — Benjamin P Lee
(74) *Attorney, Agent, or Firm* — Sheppard, Mullin, Richter & Hampton LLP

(57) ABSTRACT

An aircraft for transporting a plurality of cargo containers comprising a forward fairing, an empennage and a spine disposed between the forward fairing and the empennage. The spine is made of a lightweight structure such that the aircraft has insufficient rigidity to withstand bending and tortional loads in flight. A cargo assembly comprising a plurality of modular cargo units is structurally and detachably mounted onto the spine to provide the additional structure to the aircraft required for it to fully withstand the bending and tortional loads of the aircraft in flight. Mounts may be provided to detachably engage the cargo assembly to the spine of the aircraft.

8 Claims, 15 Drawing Sheets

(56) References Cited

U.S. PATENT DOCUMENTS

| | | | |
|---|---|---|---|
| 3,966,285 A | 6/1976 | Porch et al. | 312/265.4 |
| 3,972,427 A | 8/1976 | Stanley et al. | 244/137.1 |
| 4,039,163 A * | 8/1977 | Shorey | 244/137.1 |
| 4,301,984 A | 11/1981 | Olason | 244/137.1 |
| 4,379,533 A | 4/1983 | Caldwell et al. | 244/118.1 |
| 5,238,102 A | 8/1993 | Langer | 206/3 |
| 5,240,207 A | 8/1993 | Eiband et al. | 244/190 |
| 5,816,425 A | 10/1998 | Keip et al. | 220/4.31 |
| 5,975,464 A | 11/1999 | Rutan | 244/120 |
| 6,070,460 A | 6/2000 | Leslie et al. | 73/170.07 |
| 6,237,795 B1 | 5/2001 | Buckley et al. | 220/1.5 |
| 6,308,131 B1 | 10/2001 | Fox | 701/124 |
| 6,363,586 B1 | 4/2002 | Neufingerl | 24/287 |
| 6,494,404 B1 | 12/2002 | Meyer | 244/118.2 |
| 6,554,225 B1 * | 4/2003 | Anast et al. | 244/117 R |
| 6,557,800 B2 * | 5/2003 | Medina et al. | 244/118.1 |
| 6,817,579 B2 | 11/2004 | Van der Velden et al. | 244/137.2 |
| 7,000,765 B2 | 2/2006 | Hase et al. | 206/503 |
| 7,003,374 B2 | 2/2006 | Olin et al. | 700/213 |
| 7,014,234 B2 * | 3/2006 | Walker | 294/81.53 |
| 7,261,257 B2 | 8/2007 | Helou, Jr. | 244/137.1 |
| 7,344,109 B1 * | 3/2008 | Rezai | 244/118.2 |
| 7,534,082 B2 * | 5/2009 | Rawdon et al. | 414/347 |
| 7,604,204 B2 * | 10/2009 | Jacobsen et al. | 244/137.1 |
| 7,845,898 B2 * | 12/2010 | Rawdon et al. | 414/809 |
| 2003/0214143 A1 | 11/2003 | Walker | 294/81.53 |
| 2004/0135031 A1 | 7/2004 | Stupakis | 244/13 |
| 2005/0247824 A1 | 11/2005 | Allison | 244/137.2 |
| 2006/0022090 A1 | 2/2006 | McCoskey et al. | 244/137.1 |
| 2006/0038077 A1 | 2/2006 | Olin et al. | 244/137.1 |
| 2006/0108477 A1 | 5/2006 | Helou | 244/137.1 |
| 2007/0025832 A1 * | 2/2007 | Rawdon et al. | 414/401 |
| 2007/0125908 A1 | 6/2007 | Eichholz et al. | 244/118.1 |
| 2009/0026314 A1 * | 1/2009 | Helou, Jr. | 244/118.1 |
| 2009/0114773 A1 | 5/2009 | Helou | 244/137.1 |
| 2010/0252682 A1 * | 10/2010 | Pahl | 244/129.5 |

* cited by examiner

CARGO AIRCRAFT SYSTEM

CROSS-REFERENCE TO RELATED APPLICATIONS

This application is a continuation-in-part of U.S. patent application Ser. No. 12/636,381 filed on Dec. 11, 2009, now pending, which is a divisional application of U.S. patent application Ser. No. 11/782,850, filed Jul. 25, 2007, now U.S. Pat. No. 7,699,267, which is a divisional application of U.S. patent application Ser. No. 10/996,799, filed Nov. 23, 2004, now U.S. Pat. No. 7,261,257.

FIELD OF THE INVENTION

The present invention relates to a cargo aircraft system and, more particularly, to a cargo aircraft system that is designed to transport modular cargo units of various configurations and sizes.

BACKGROUND

The basic unit for transporting goods has been the truck. Being the basic unit, the truck has defined limitations on intermodal containers that can typically be transported by ships, trains and trucks. However, airplanes have generally been excluded from participation in intermodal and many other types of cargo. This is due to the limitations placed by the design and construction of cargo airplanes.

The design and construction of most civilian cargo aircraft are based on that of passenger airplanes. The basic structure is a monocoque-based fuselage which is substantially cylindrical in shape. Monocoque-based structures support the structural load of an aircraft by a unitary structural body, as opposed to heavier internal frames or trusses. The unibody construction of the monocoque-based aircraft generally lack sufficient structure to adequately or efficiently support and distribute concentrated cargo loads across the aircraft fuselage and to the wings.

Additionally, the cylindrically-shaped fuselage imposes additional restrictions on cargo size and dimensions. Thus, cargo having irregular or unusually large dimensions are generally unsuited for air transport via today's cargo aircraft. Moreover, as most cargo units are substantially rectangular in shape, loading such cargo units into a cylindrical fuselage results in a significant amount of wasted dead space.

SUMMARY

The cargo aircraft systems disclosed herein comprise a spine structure onto which a cargo assembly may be mounted. The spine structure replaces the cylindrically-shaped monocoque-based fuselages of today's aircraft and has sufficient structure, in combination with the cargo assembly, to distribute concentrated cargo loads along its length and to the wings. The cargo assembly is an integrated and unitary structure formed from one or a plurality of cargo units coupled together. The cargo unit may be a modular frame unit or a modular container unit and the resulting cargo assembly may be any one or a combination of modular frame and container units. The cargo assembly is structurally integrated with the spine to form part of the aircraft structure such that the aircraft is able to withstand tortional and bending loads experienced during flight. Thus, the cargo assembly augments the structure of the spine, which itself would not be able to sustain the tortional and bending loads of the aircraft when the spine is loaded with the cargo assembly. Moreover, because the cargo aircraft eliminates the need for additional structure to support the load of the cargo assembly, a significant reduction in the weight of the cargo aircraft is realized. This, in turn, results in greater fuel efficiency and decreased cost of operation.

In one embodiment, a cargo assembly is provided. The cargo assembly is configured to be structurally integrated to a spine of an aircraft. The cargo assembly comprises a plurality of modular cargo units, a first load transfer system and a second load transfer system. The first load transfer system comprises a plurality of first attachments to removably couple adjacent modular cargo units. The second load transfer system comprises a plurality of second attachments to removably mount and structurally integrate the cargo assembly to the spine of the aircraft. The first and second load transfer systems distribute the aerodynamic load of the aircraft in flight between the plurality of modular cargo units and the spine of the aircraft.

In accordance with a first aspect, the plurality of modular cargo units comprises one or more structural frames having defined spaces to accommodate cargo.

In accordance with a second aspect, the plurality of modular cargo units comprises one or more containers.

In accordance with a third aspect, the cargo assembly comprises a combination of one or more structural frames and one or more containers.

In accordance with a fourth aspect, the first load transfer system further comprises a plurality of interconnecting hinge assemblies associated with at least two of the plurality of modular cargo units.

In accordance with a fifth aspect, the first load transfer system further comprises one or more splices to couple adjacent modular cargo units.

In accordance with a sixth aspect, the one or more splices are disposed on an opposing side of the cargo assembly to a mounted side of the cargo assembly.

In accordance with a seventh aspect, the first load transfer system further comprises a tensioning system disposed within at least one of the modular cargo units.

In another embodiment, a cargo assembly is provided. The cargo assembly is configured to be structurally integrated to a spine of an aircraft. The cargo assembly comprises a plurality of modular cargo units, first attachments and second attachments. The first attachments are configured to structurally couple and integrate the plurality of cargo units into a single assembly. The second attachments are configured to structurally integrate the single assembly with the aircraft spine. The plurality of cargo units are arranged within the single assembly based on a weight of each one of the respective cargo units to obtain a center of gravity of the aircraft and the cargo assembly attached thereon within a range acceptable for flight.

In accordance with a first aspect, the modular cargo units are comprised of any one or a combination of structural frames and/or containers.

In accordance with a second aspect, the cargo units are each constructed to support a range of maximum cargo loads.

In accordance with a third aspect, the cargo units having the highest maximum cargo loads are arranged at or near the center of gravity of the unloaded aircraft.

In a further embodiment, an aircraft for transporting a plurality of cargo containers is provided. The aircraft comprises a forward fairing, an empennage, and a spine disposed between the forward fairing and the empennage. A cargo assembly is configured to be detachably integrated with the spine. The spine has a lightweight structure such that the aircraft has sufficient rigidity to withstand bending and tortional loads in flight when unloaded with the cargo assembly.

The spine, however, has insufficient rigidity to itself withstand bending and tortional loads in flight when loaded with the cargo assembly. The cargo assembly provides the additional rigidity to the spine required for the aircraft to fully withstand bending and tortional loads in flight when the cargo assembly is structurally integrated with the spine.

In accordance with a first aspect, the modular cargo units are comprised of any one or a combination of modular structural frames and cargo containers.

In accordance with a second aspect, the aircraft further comprises one or more trusses coupling the cargo assembly to the spine.

In accordance with a third aspect, the aircraft further comprises fairings to enclose the cargo assembly mounted on the spine.

In accordance with a fourth aspect, the aircraft further comprises mounts to detachably engage and structurally couple the cargo assembly to the spine.

In accordance with a fifth aspect, the mounts are disposed on the underside of the spine to detachably suspend the cargo assembly therefrom.

In accordance with a sixth aspect, the mounts are actuated between a first and second position, wherein in the first position, the mounts structurally engage the cargo assembly to the spine and wherein in the second position, the mounts disengage and therefore release the cargo assembly from the spine.

In accordance with a seventh aspect, a control is provided to alternately actuate the mounts between the first and second positions.

Other objects, features and advantages of the present invention will become apparent to those skilled in the art from the following detailed description.

BRIEF DESCRIPTION OF THE DRAWINGS

Illustrative embodiments of the present invention are described herein with reference to the accompanying drawings, in which.

Like numerals refer to like parts throughout the several views of the drawings.

DETAILED DESCRIPTION OF THE PREFERRED EMBODIMENTS

Figure 1:
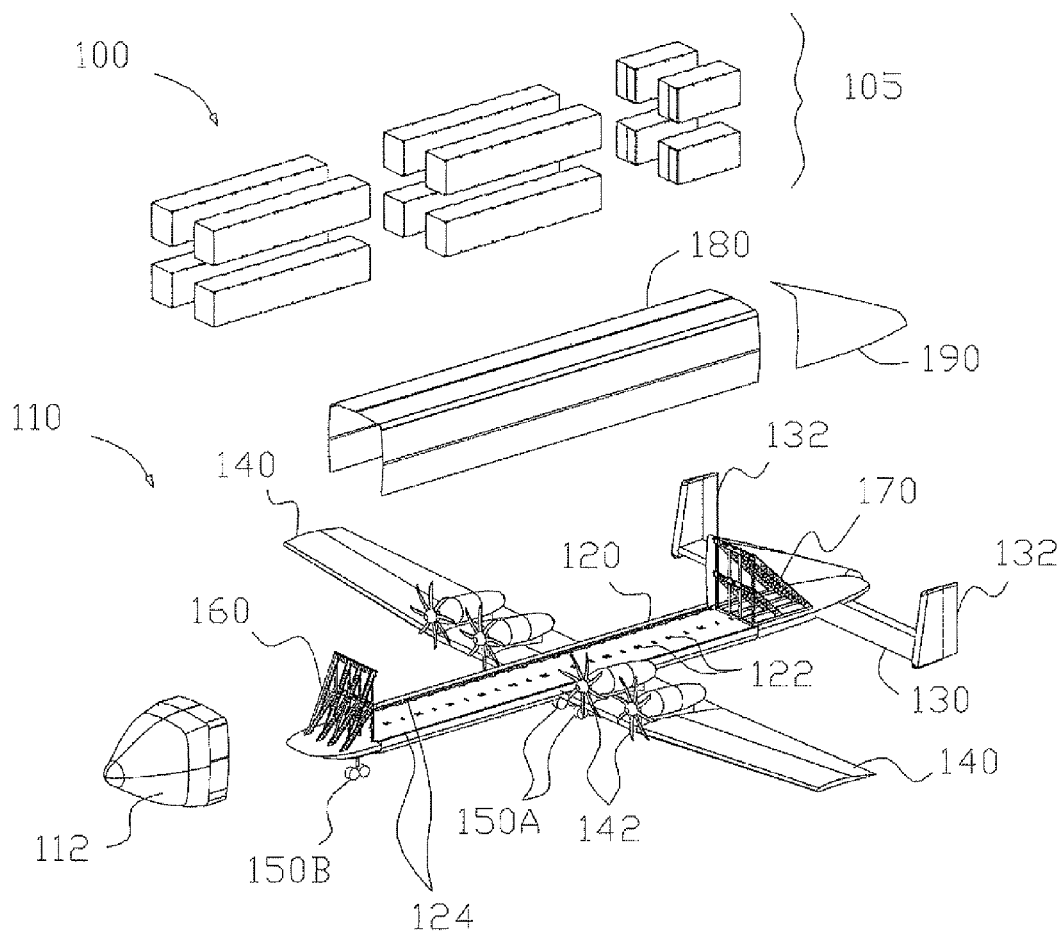
FIG. 1 is an exploded perspective view of an embodiment of a cargo aircraft system in which the aircraft has a lower spine.

FIG. 1 illustrates an embodiment of a cargo aircraft system 100. The cargo aircraft system 100 is depicted as comprising an aircraft 110 and a cargo assembly 105 comprised of modular cargo containers of various dimensions and sizes. Embodiments of the basic structure of a cargo aircraft are also described in U.S. Pat. No. 7,261,257, issued Aug. 28, 2007, the entire contents of which are incorporated herein by reference.

Generally, the cargo aircraft 110 comprises a forward fairing 112, an empennage 130 and a lower spine 120 between the forward fairing 112 and empennage 130. The lower spine 120 comprises guide flanges 124 which run longitudinally along each side of the spine 120 to guide the cargo assembly 105 in place during loading on the lower spine 120. A plurality of mounts 122 is disposed at various intervals along the lower spine 120 to structurally engage the cargo assembly 105 at various attachment points onto the lower spine 120.

Wings 140 are structurally associated with the lower spine 120. Wings 140 may optionally contain fuel tanks (not shown). Landing gear 150A may be provided under the wings 140 and or lower spine 120 and a forward gear 150B may be provided under the lower spine 120 or the forward fairing 112. Alternatively, the landing gear may have their own fairings or pods. Engines 142 are shown in the embodiment of FIG. 1 to be mounted on top of the wings 140. It is understood that the engines 142 may also be mounted under the wings 140 and/or on the spine 120. Aerodynamic fairings 180, 190 may be optionally provided to enclose the cargo assembly 105 and the trusses 160, 170. The aerodynamic fairings 180, 190 are made of a composite light weight material and the primary function of the aerodynamic fairings is to reduce drag. In a particularly preferred embodiment, the aerodynamic fairings do not provide substantial, if any, support or rigidity to the aircraft in flight.

Trusses 160, 170 further engage the cargo assembly 105 to the lower spine 120. Trusses 160, 170 provide additional structural support to the aircraft to withstand bending moments in flight and provide further support and integration of the cargo assembly 105 onto the lower spine 120. Depending on the direction from which the cargo assembly is loaded onto the spine, either one or both of the forward truss 160 and the rear truss 170 may be removably attached to the spine 120. Thus, for example, in an embodiment where the cargo assembly is loaded through the empennage 130 of the aircraft 110, the rear truss 170 would be removed from the spine 120 prior to loading.

Figure 2:
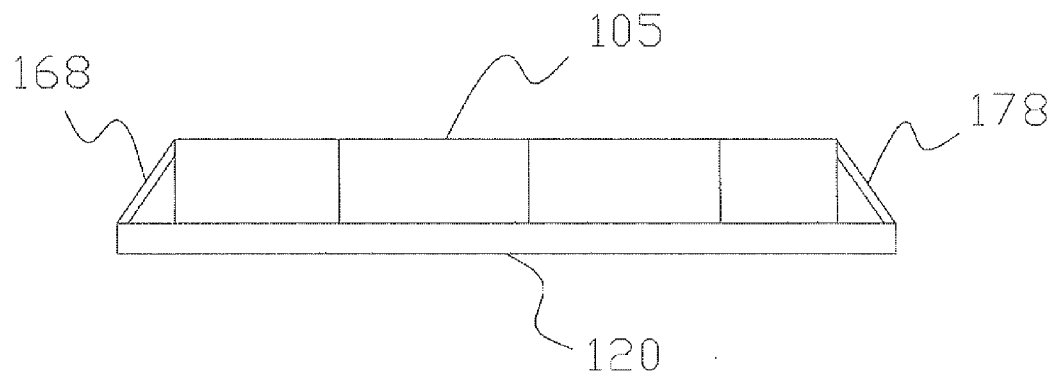
FIG. 2 is a simplified elevation view of a single-layer cargo assembly mounted on a spine.

FIG. 2 depicts the points of attachments at which the bending moments may be transferred between the cargo assembly 105 and the lower spine 120. It is understood that while FIG. 2 depicts cargo assembly comprising only a single layer of modular container units, cargo assemblies comprising multiple layers modular container or frame units may also be accommodated by modifying the truss 168, 178 to include additional points of attachment for each layer.

Figure 3:
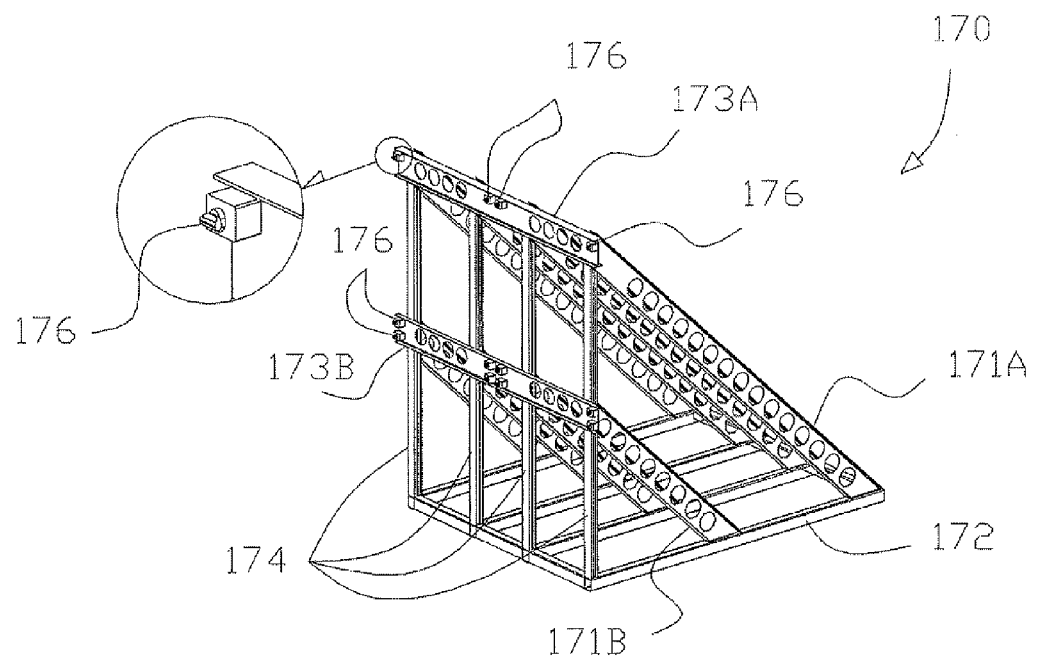
FIG. 3 is a perspective view of an embodiment of a support truss.

FIG. 3 depicts an exemplary rear truss 170 that may be used to couple cargo assemblies comprising two layers of modular containers or frame units. The truss 170 comprises horizontal support members 172 fixed to vertical support members 174 at a 90 degree angle. Two sets of diagonal support members 171A, 171B couple the horizontal support members 172 and the vertical support members 174 at different points corresponding roughly to the heights of the first and second layers of the cargo assembly 105. Stabilizer bars 173A, 173B are optionally provided along the points where the diagonal support members 171A, 171B are joined to the vertical support members 174. Mounts 176 are provided along the stabilizer bars 173A, 173B to securely fasten the cargo assembly to the truss 170. The forward truss 160 is understood to be constructed in a manner similar to the rear truss 170, with the exception that the forward truss 160 may be permanently affixed to the spine 120, whereas the rear truss 170 may be a removable structure in embodiments where the cargo assembly 105 is loaded through the empennage 130 of the aircraft 110.

Figure 4A:
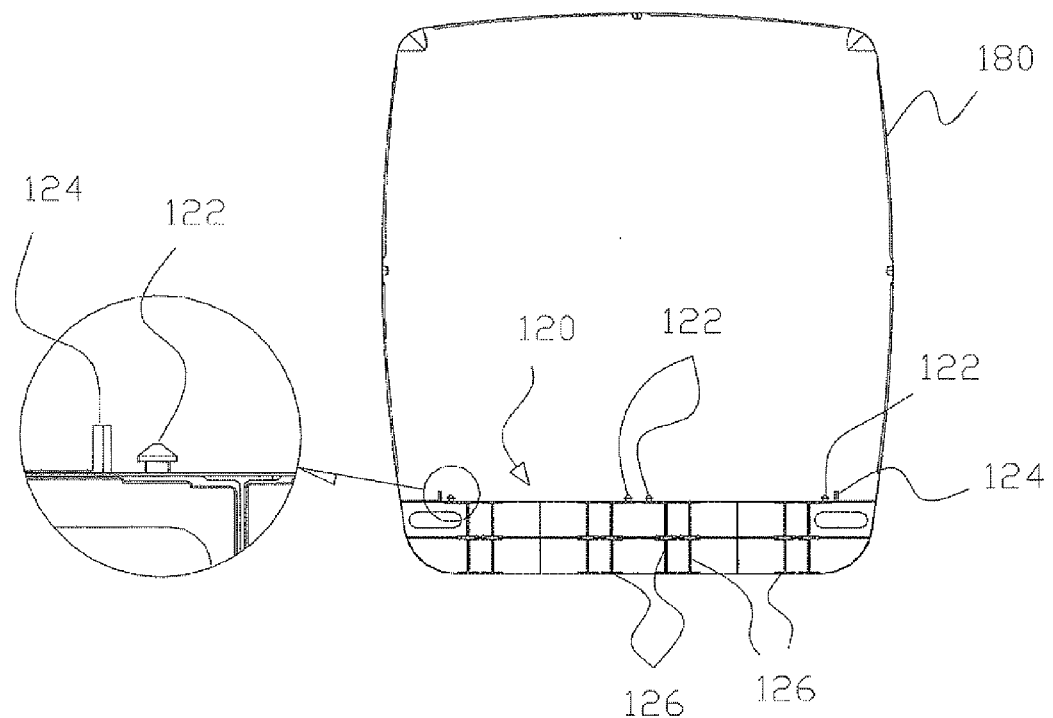
FIG. 4A is cross-sectional view taken transversely through a lower aircraft spine section.
Figure 4B:
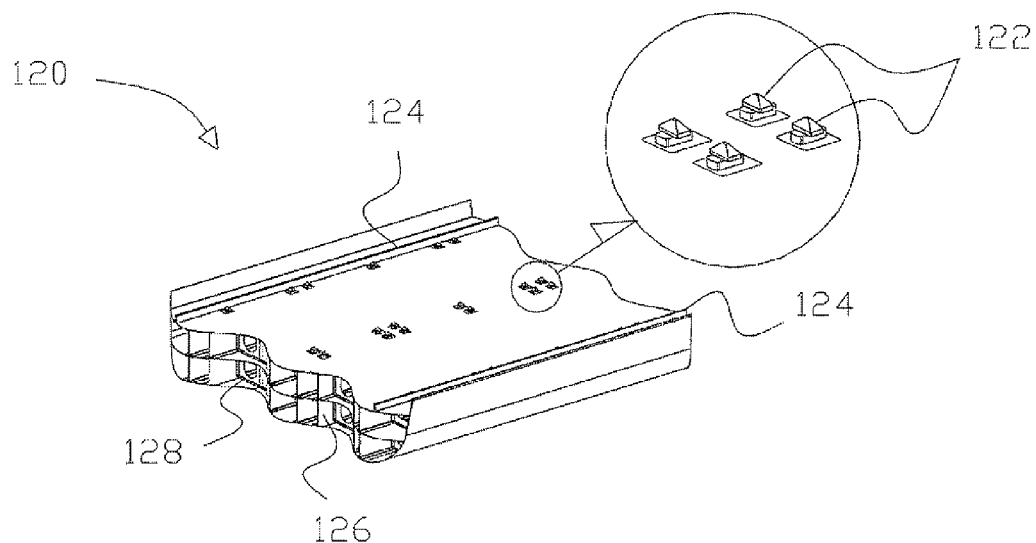
FIG. 4B is a cut-out cross-sectional view taken transversely of a lower aircraft spine section.
Figure 4C:
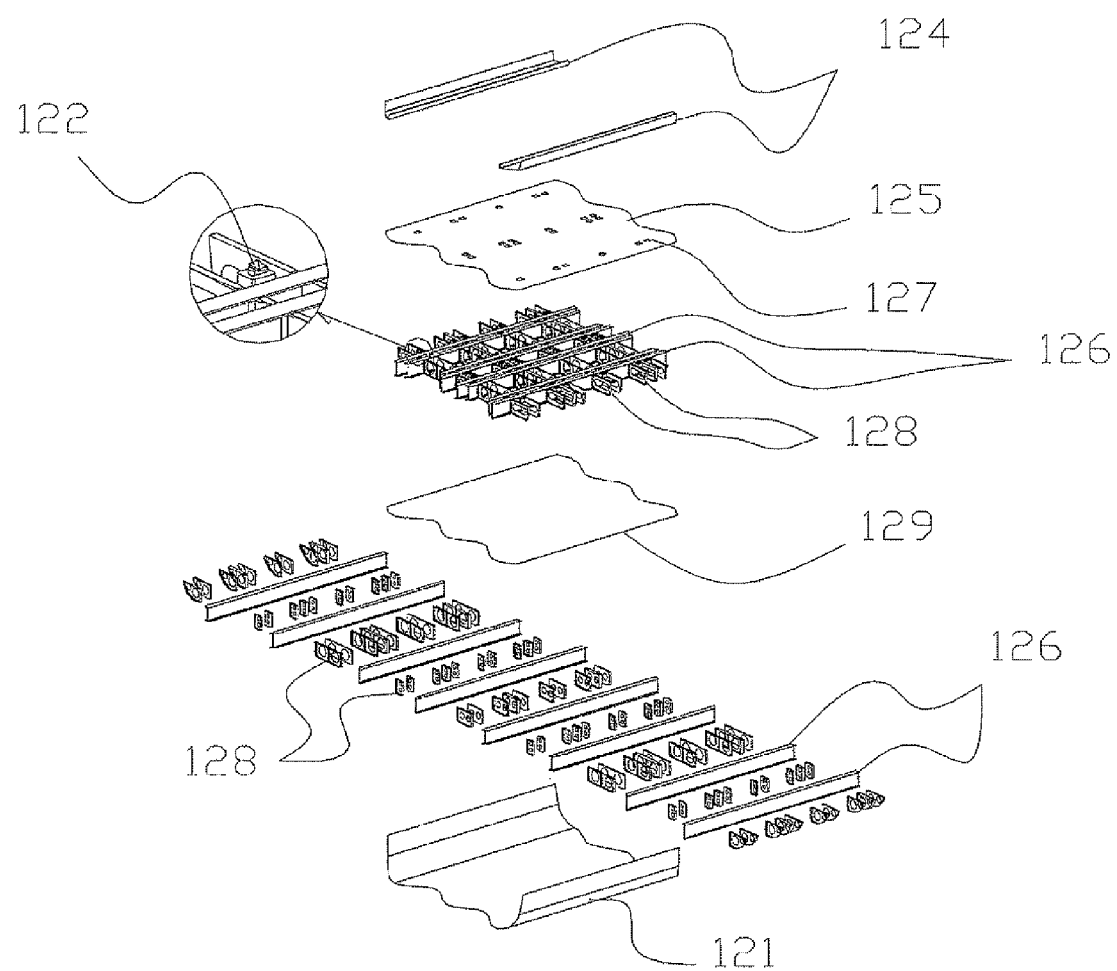
FIG. 4C is an exploded perspective showing components of a lower aircraft spine section.

FIGS. 4A-C show the structure of the lower spine 120 of the cargo aircraft 110 in greater detail. The structural support of the lower spine 120 comprises layers of interconnected bulkheads 128 and spars 126. The bulkheads 128 and spars 126 may be interconnected by means known in the art such as, for example, by bolting, riveting, welding, friction stir welding, or bonding. While the lower spine 120 depicted in FIGS. 4A-C show two layers of interconnected bulkheads 128 and spars 126, it is understood that a lighter weight spine 120 comprising only a single layer of interconnected bulkheads 128 and spars 126 may be provided for lighter cargo assembly weight loads. Alternatively, additional layers of interconnected bulkheads 128 and spars 126 may be provided to accommodate cargo assemblies having higher weight loads.

The layers of interconnected bulkheads 128 and spars 126 may be enclosed by a spine surface 125 and an aerodynamic fairing or skin 121 to form a torque box. The spine surface 125, upon which the cargo assembly is mounted, may comprise a pair of guide flanges 124 disposed longitudinally along the spine 120. The spine surface 125 may further comprise openings 127 to expose the mounts 122 coupled to the interconnected bulkheads 128 and spars 126. The exposed mounts 122 provide a point of attachment for the cargo assembly 105. In a preferred embodiment, the mounts 122 are designed to retract below the spine surface 125 to allow the container assembly to slide across the spine. The embodiment of the spine 120 shown in FIG. 4A-C is especially suited for cargo assemblies 105 which comprise two layers of stacked cargo units, as it comprises two layers of interconnected bulkheads 128 and spars 126.

Figure 5:
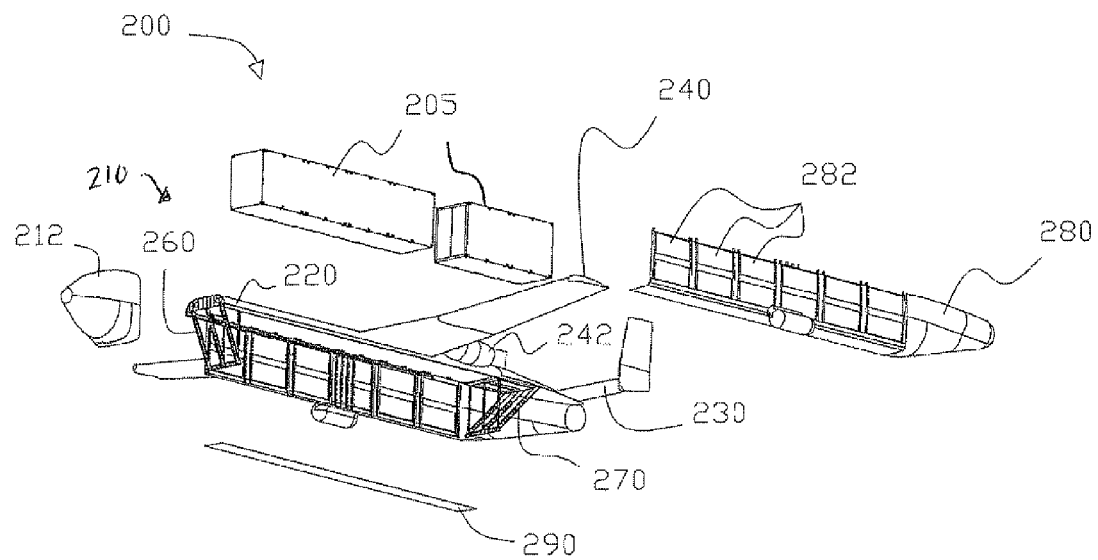
FIG. 5 is an exploded perspective view of another embodiment of a cargo aircraft system in which the aircraft has an upper spine.

FIG. 5 illustrates another exemplary embodiment of the cargo aircraft system 200 comprising a cargo aircraft 210 and a cargo assembly 205. Unlike the cargo aircraft of FIG. 1, an upper spine 220 connects the forward fairing 212 and the empennage 230. Thus, the cargo assembly 205 is suspended from the underside of the upper spine 220. In accordance with one embodiment, in which the empennage is comprised of two halves pivotally attached to the spine, the rear truss structure 270 may also be constructed in two pieces such that when the empennage opens to allow entry of the cargo assembly for loading, the rear truss structure 270 may similarly be opened with the empennage to expose the spine 220 for loading. Alternatively, in embodiments where the entire empennage is pivotally attached to the spine, the entire rear truss structure 270 may also be coupled to the empennage and similarly rotated away from the spine to expose the spine for loading from the rear. It is understood that these embodiments may also be implemented with the lower spine aircraft depicted in FIG. 1.

Wings 240 are structurally associated with the upper spine 220 and may also contain fuel tanks (not shown). The upper spine 220 may also carry fuel. The upper spine 220 further comprises guide flanges 224 which run longitudinally along the underside surface of the upper spine 220. A plurality of mounts 222 are provided throughout the underside of the lower spine 220 and are configured to secure and integrate the cargo assembly 205 with the upper spine 220. Although FIG. 5 depicts the engines 242 as being mounted on top of the wings 240, it is understood that the engines 242 may also be mounted under the wings 240 or even on the upper spine 220 or a combination thereof. Aerodynamic fairings 280, 290 may be optionally provided to enclose the cargo assembly 205 and the trusses 260, 270. The aerodynamic fairings 280 may further comprise a plurality of opening panels 282 to expose portions of the cargo assembly 205. Again, in a particularly preferred embodiments, the aerodynamic fairings are made as lightweight as possible and do not contribute significant, if any, structural support to the aircraft.

Figure 6A:
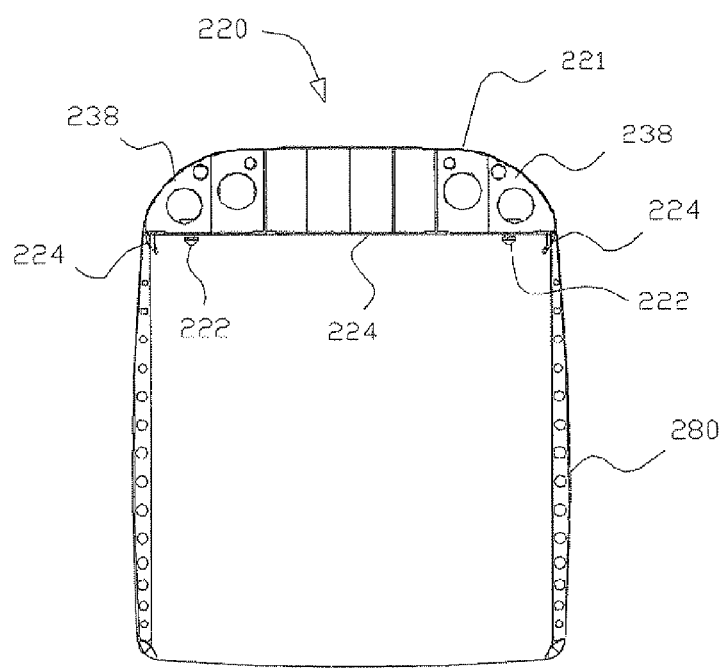
FIG. 6A is cross-sectional view taken transversely through an upper aircraft spine section
Figure 6B:
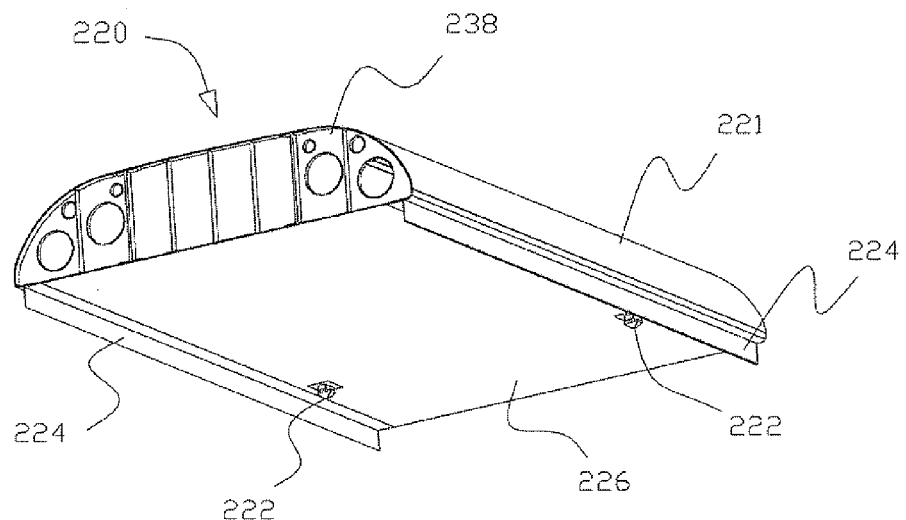
FIG. 6B is a cut-out cross-sectional view taken transversely of an upper aircraft spine section.
Figure 6C:
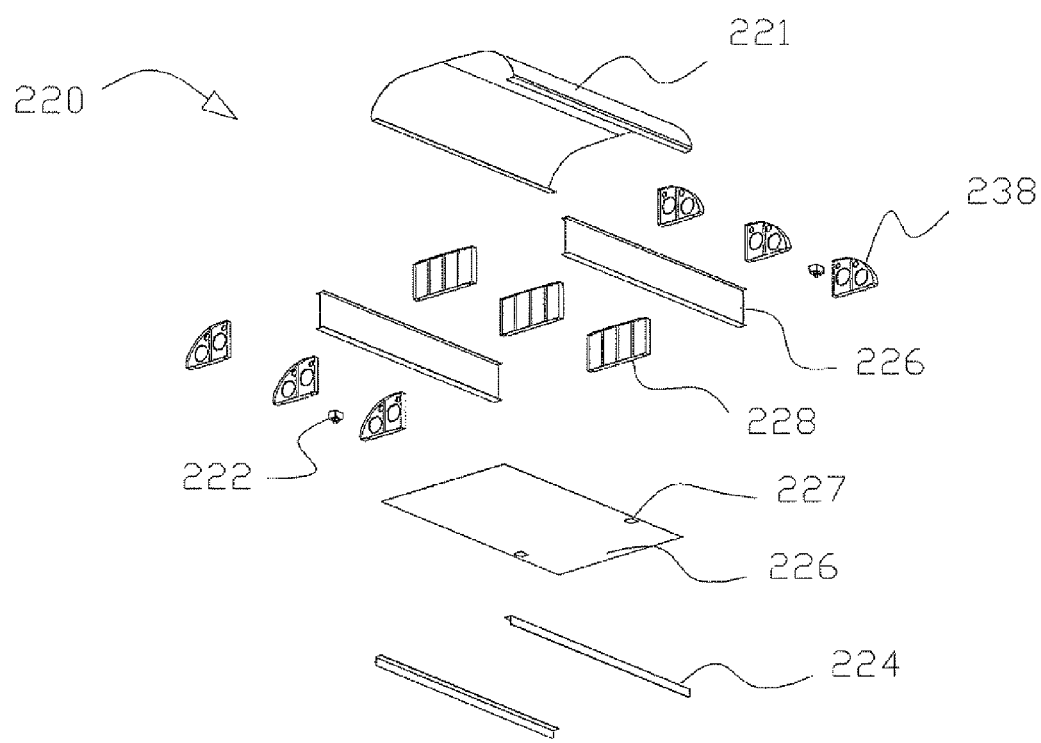
FIG. 6C is an exploded perspective showing components of an upper aircraft spine section.

FIGS. 6A-C show the structure of the upper spine 220 in greater detail. Upper spine 220 comprises a layer of interconnected spars 126 and bulkheads/ribs 228, 238 to which mounts 222 are attached. A surface 226 having a plurality of openings 227 is provided to expose the mounts 222. In contrast to the lower spine 120 of FIGS. 4A-C, the upper spine 220 of FIGS. 6A-C comprise only a single layer of structural support to support a cargo assembly comprising a single row of containers. It is understood that additional layers of interconnected spars 226 and bulkheads/ribs 228, 238 may be provided as required by higher weight regimes.

The spine structure depicted in FIGS. 1-2 and 4-6 are designed to be as light as possible. As such, the spine structure is capable of supporting takeoff loads, flight loads and landing loads of the aircraft when free of cargo. However, when the cargo assembly is mounted on the spine, the spine, by itself, is not required to fully sustain bending and tortional loads in flight, and landing and takeoff loads. The additional rigidity required is supplied by the cargo assembly. The cargo assembly augments the spine and aircraft structure so as to support these loads when it is structurally integrated to the spine. To this end, the individual units comprising the cargo assembly are constructed with sufficient structure and rigidity and are securely mounted to the spine such that bending and tortional forces experienced by the spine structure are imposed upon the cargo assembly.

The simplicity of the spine structure furthermore permits it to be configured in any variety of widths and weight capacities. Thus, for example, the spine may be configured to support extra large cargo loads which cannot be transported within standard intermodal containers by simply increasing the width and the number of layers of interconnected bulkheads and spars to an extent necessary to accommodate such extra large cargo loads. Thus, the spine permits greater flexibility with respect to the dimensions of the cargo assembly than would be realized by an aircraft with the standard monocoque-based cylindrical fuselage. Moreover, the structural features of the spine allow for the cargo load to be more efficiently distributed along the spine and also to the wings.

Thus, the cargo assembly is integrated as part of the structure of the aircraft such that it provides the rigidity required to fully sustain the bending and tortional loads exerted on the aircraft in flight. The cargo assembly may be comprised of structural frame assemblies or structural container assemblies. The structural frame assemblies, in turn, may be comprised of modular frame units of varying dimensions, sizes and weight capacities. Similarly, the structural container assemblies may be comprised of modular container units, also having varying dimensions, sizes and weight capacity as dictated by the needs of the cargo being transported.

The cargo assembly may be constructed as comprising structural frame assemblies, structural container assemblies, or combinations thereof. The modular nature of the containers and frames allows great flexibility in creating a final cargo assembly that is capable of accommodating various types, sizes, dimensions and weights of cargo. Once these modular units are structurally coupled together to form a cargo assembly, they may be coupled to the aircraft spine to provide an integrated structure that is capable of taking on and distributing bending and tortional loads to the spine and the wings of the aircraft.

Figure 7A:
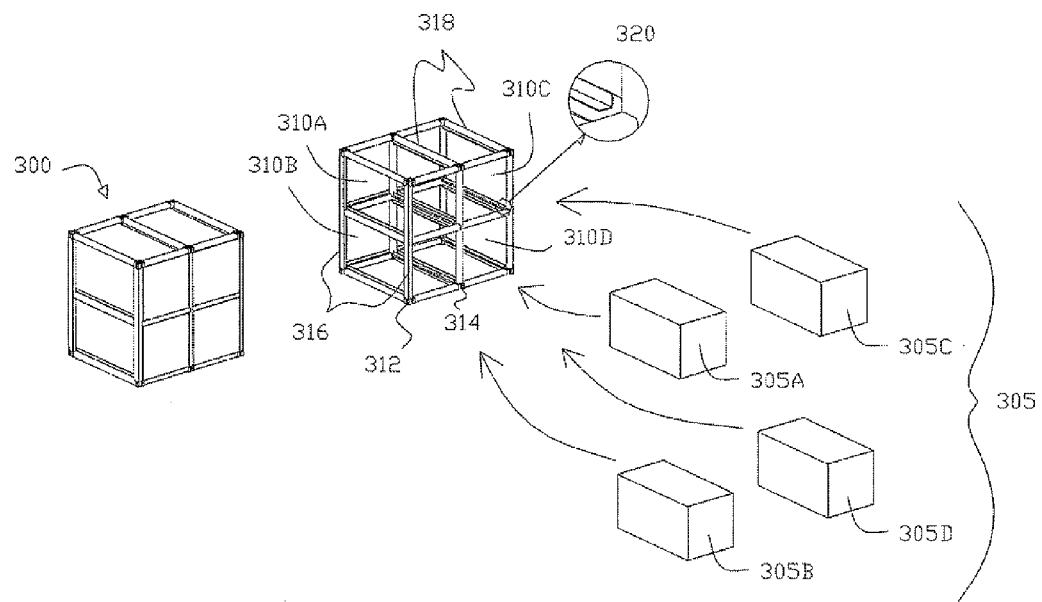
FIGS. 7A-7C are perspective views of an embodiment of modular frame units configured to be coupled together to form a structural frame assembly.
Figure 7B:
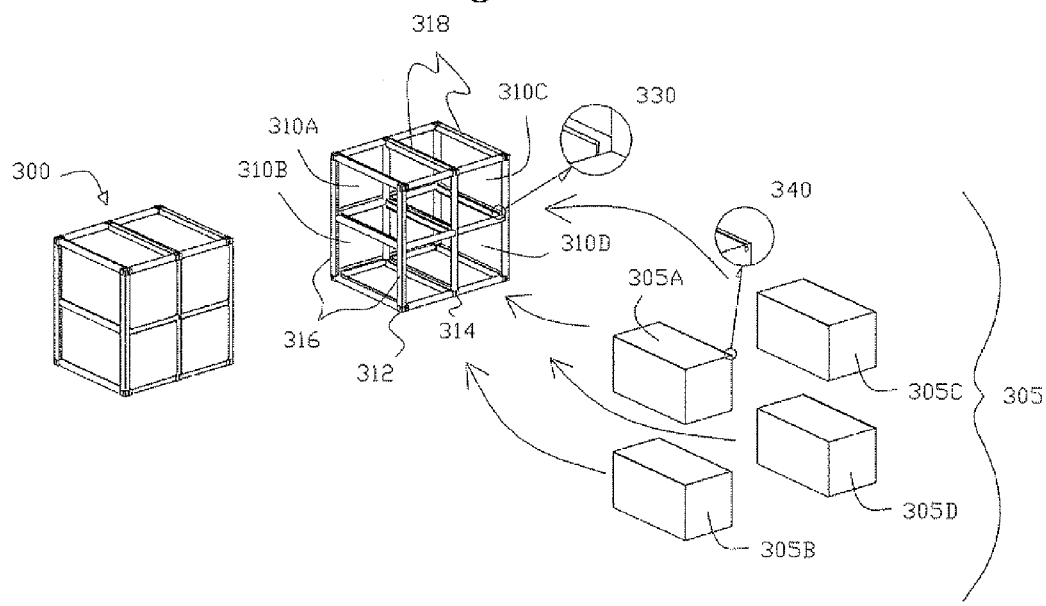
Figure 7C:
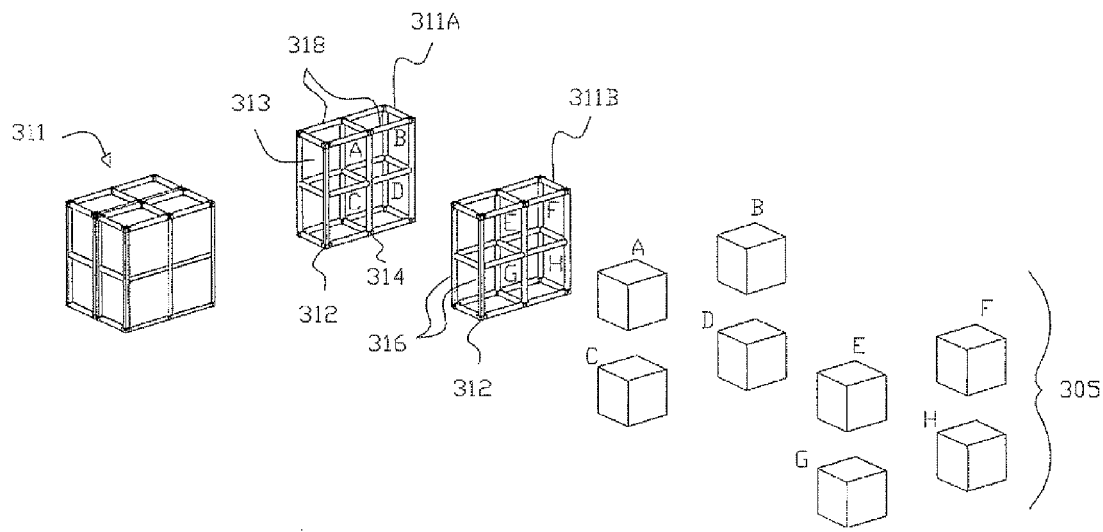

FIGS. 7A-C depict exemplary embodiments of modular structural frame units 300 which may be used to accommodate units of cargo of varying dimensions. Each of the modular structural frame units 300 depicted in FIGS. 7A-C are configured to be coupled with one another to create a larger integrated structural frame assembly. It is understood that the greater the number of attachments between modular frame units 300, the more efficiently load is transferred and distributed among the modular frame units 300. In one exemplary embodiment, frame units 300 are structurally attached to one another by couplers (see FIG. 10) which attach facing end attachments 312 and corner attachments 314 of the adjacent structural frame assemblies.

As shown in FIGS. 7A-B, the modular frame units 300 comprise a plurality of vertical frame members 316 and horizontal frame members 318 which are coupled together to form a parallelepiped shaped structure. The modular frame units 300 include a plurality of defined spaces 310A-D which may accommodate units of cargo 305A-D, respectively. While the plurality of defined spaces 310A-D in FIGS. 7A-B are depicted as rectangular shaped spaces to accommodate rectangular shaped cargo units, it is understood that the modular frame units 300 may be configured to accommodate cargo units of other shapes and sizes.

The modular frame units 300 may further comprise means by which individual cargo units 305A-D may be secured onto the defined spaces 310A-D. As shown in FIG. 7A, brackets 320 may be coupled to opposing horizontal frame members 318 to allow the cargo units 305A-D to be slidably inserted into the respective defined spaces 310A-D. Alternatively, a tongue-in-groove fitting may be provided, as shown in FIG. 7B, in which frame unit 300 includes a plurality of tongue fittings 330 along the horizontal frame member 318 and the cargo units 305A-D each comprise corresponding groove fittings 340 to slidably engage the tongue fittings 330 disposed in the defined spaces 310A-D. While FIG. 7B shows the frame assembly 310 as comprising the tongue fittings 330 and the cargo units 305A-D as comprising the groove fittings 340, it is understood that the tongue fittings 330 and groove fittings 340 may be provided on either one or a combination of the frame assembly 310 and the cargo units 305A-D.

Figure 10:
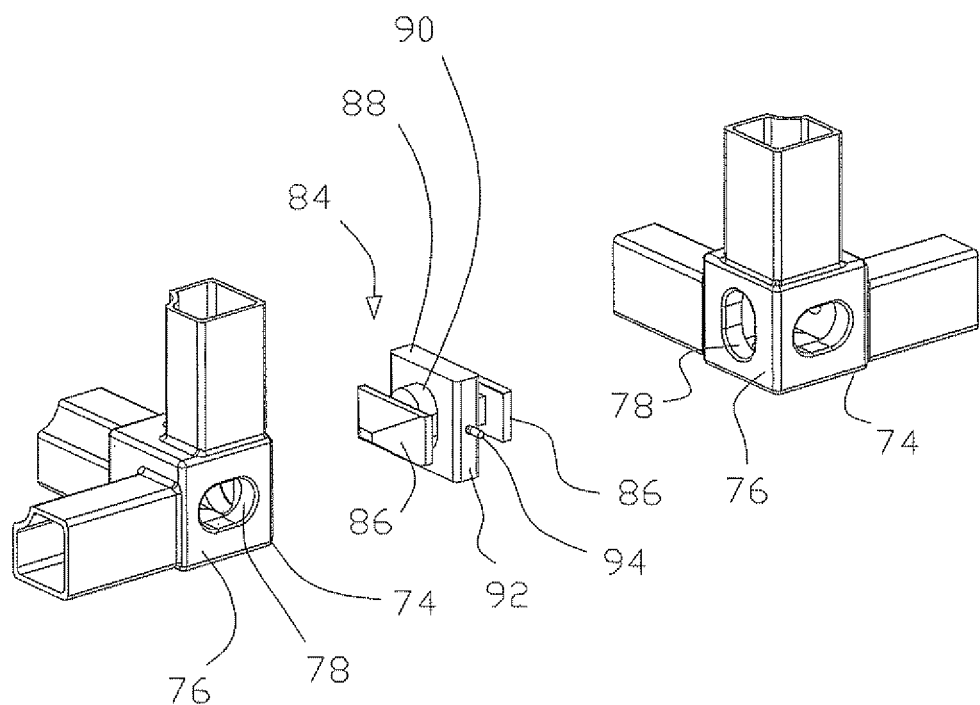
FIG. 10 is an exploded perspective view of a pair of corner attachments and a coupler.

FIG. 7C shows another embodiment of the structural frame assembly 311 which comprise two structural frames 311A and 311B which are coupled together at facing corner attachments 312 and side attachments 314 of adjacent frame assemblies via couplers (see FIG. 10). The structural frames 311A, 311B depicted herein provide eight defined spaces 313A-H which may accommodate cargo units 305A-H, respectively. While not shown in FIG. 7C, it is understood that the frame assembly 311 of FIG. 7C may employ the same means (e.g., brackets, tongue and groove fittings, etc.) depicted in FIGS. 7A-B to secure the individual cargo units 305A-H within the respective defined spaces 313A-H in the structural frame assembly 311.

An integrated structural frame assembly may be created by structurally attaching the modular frame units depicted in FIGS. 7A-C by means of the corner attachments 312 and side attachments 314. This integrated structural frame assembly may be of sufficient strength and rigidity to support the cargo units and the aerodynamic load, including the bending and tortional loads of the cargo aircraft in flight.

In preferred embodiments, the integrated structural frame assembly is constructed of lightweight materials which have sufficient strength and rigidity to at least support a cargo unit up to a defined weight. Exemplary materials include lightweight metals or allows thereof, such as aluminum and titanium and steel or a combination of metal and composite structures or even innovative layers of different metals and lattice structures. Other exemplary materials include composites such as carbon epoxy laminates, as well as foam core and honeycomb core structures.

In other preferred embodiments, the individual cargo units are provided in containers which are also configured to provide additional structure to support the load of the aircraft in flight. This may be accomplished by effectuating a structural attachment between the cargo units and the frame assemblies (as shown in FIG. 7B). Thus, in these other preferred embodiments, both it is the combination of the integrated frame structure and the individual cargo units that provides the strength and rigidity to support the aircraft in flight.

Figure 8A:
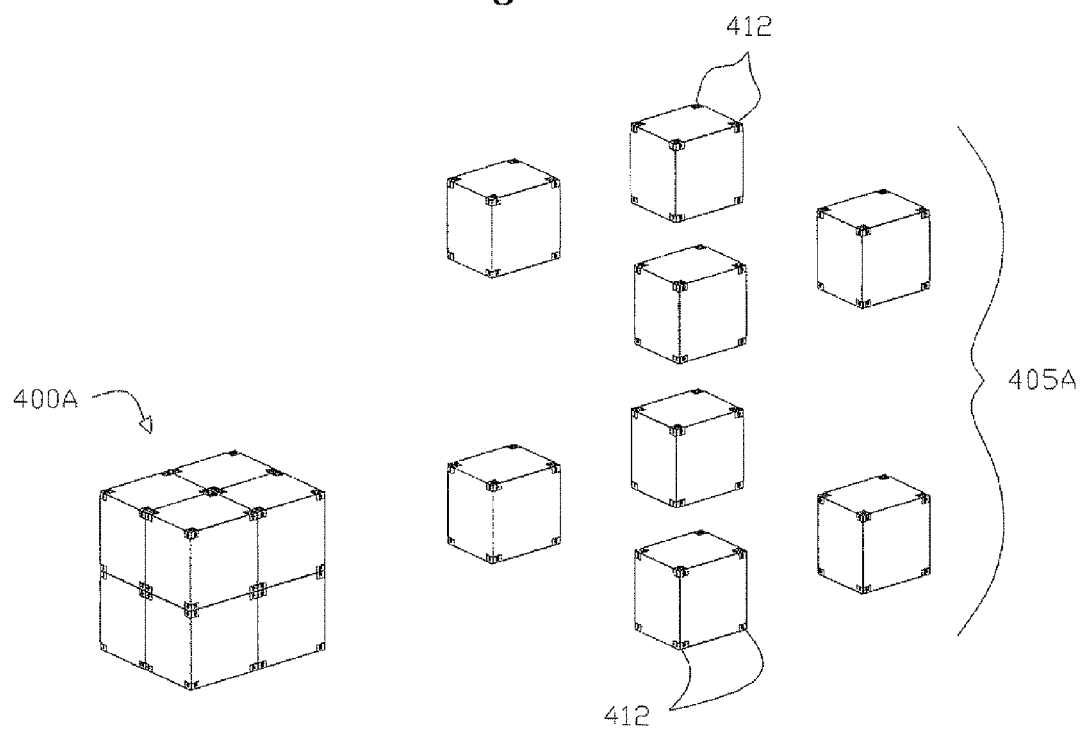
FIGS. 8A-8B are perspective views of an embodiment of modular container units configured to be coupled together to form a structural container assembly.
Figure 8B:
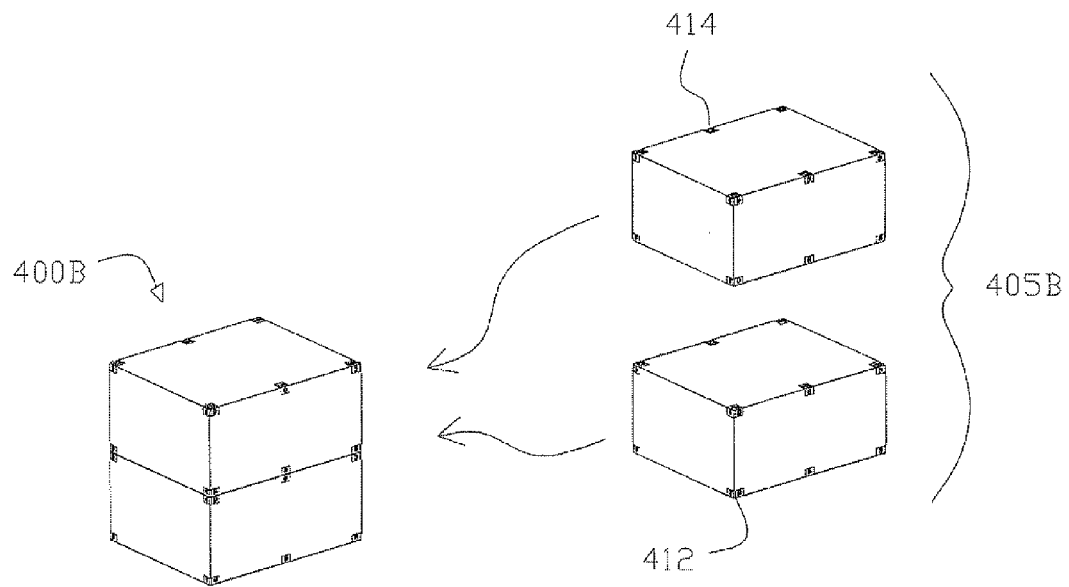

FIGS. 8A-B show modular container units which may also comprise the cargo assembly that is mated onto the aircraft spine. In contrast to the modular frame units, modular container units provide an enclosed space within which cargo units may be placed. Similar to the modular frame units, the modular container units provide the structure and rigidity to the final assembled cargo assembly which, in turn, provides this rigidity to the spine to support the aircraft in flight. The modular container units are each structurally attached to one another so as to distribute the aerodynamic load between them. Thus, the individual cargo containers are preferably constructed from rigid materials which are capable of withstanding and distributing bending, tortional, compression and tension loads of the loaded aircraft during flight. Exemplary materials include lightweight metals or allows thereof, such as aluminum and titanium and steel or a combination of metal and composite structures or even innovative layers of different metals and lattice structures or a combination of metal and composite structures. Other exemplary materials include composites, such as carbon epoxy laminates, as well as foam core and honeycomb core structures.

FIGS. 8A-B show modular container units of various sizes are configured to structurally mate with one another to create a cargo assembly. In FIG. 8A, the modular container units 405A may be aggregated and structurally attached to one another via corner attachments 412 to create a larger structural container assembly 400A. This larger container assembly 400A may be further joined to other container assemblies or structural frame assemblies to create an integrated cargo assembly that may be mounted onto the aircraft spine. In FIG. 8B depicts the modular container units 405B are rectangular in shape and may be aggregated and structurally attached to one another via both corner attachments 412 and side attachments 414.

Figure 9:
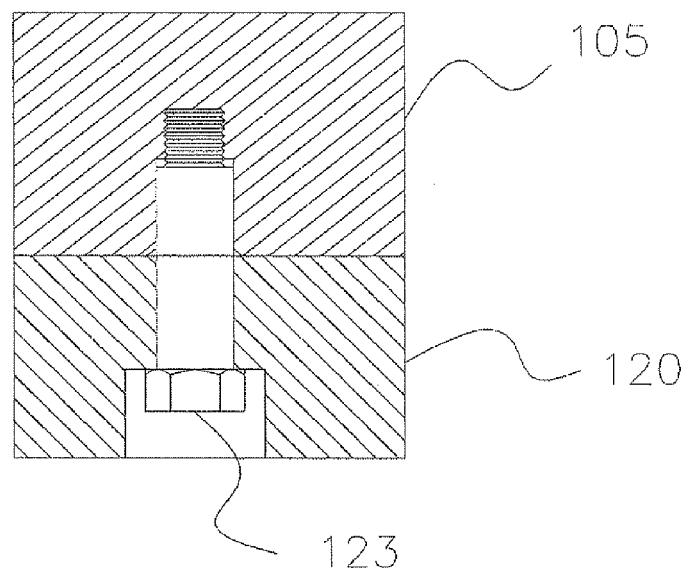
FIG. 9 is a cross-sectional view of an embodiment of a mount coupling a cargo container to a spine.

Both the structural frame assemblies and the structural container assemblies may be attached to the spine via mounts. FIG. 9 shows an exemplary embodiment of a mount 123 that may be provided on the spine structure 120. While FIG. 9 shows the mount 123 as connecting a container 105 with the spine structure 120, it is understood that the mount 123 may also be used to connect adjacent containers together to form the cargo assembly.

Mounts such as the one depicted in FIG. 9 may be bolted or otherwise retained on the spine 120. Further, incremental adjustments are preferably provided in order that the mounts 123 may attach to the container or containers 105 while accommodating variations in container length and placement. Such incremental adjustment may be provided by patterns of attachment holes in the spine 120 to allow for lateral or longitudinal repositioning of the mounts 123 once the container or containers 105 are in place. A mount 123 is illustrated in FIG. 9 as a shoulder bolt 123 which extends between the spine structure 120 and a container 105. Such a bolt 123 provides substantial shear resistance as well as tension loading. The mounts 123 may be located or positionable along the full length of the spine 120 or at incremental positions reflecting standard container sizes. The mounts 123 may face inwardly from the sides of the spine 120. Access ports through the fairings may be provided to allow access to the mounts 123 or sufficient space may be provided between the aerodynamic fairing and the container assembly sidewall to allow personnel to inspect as well as attach the containers to the spine without having access panels through the side fairings. In yet an alternative embodiment, mechanisms may be employed to remotely actuate the mounts to engage and disengage the containers.

FIG. 10 further illustrates the attachments that may be used to couple adjacent structural frames and containers. Corner attachments 74 comprise formed boxes 76 through which slots 78 extend. By employing the formed boxes 76, the slots 78 terminate to provide an inner face. The attachments 74 cooperate with the formed boxes 74 with slots 76 through the walls thereof. The formed boxes 76 may include thick walls on one outer side or bottom to receive the mounts 123. To fix the attachments 74 to one another, couplers 84 are employed. Each coupler 84 includes two heads 86 extending in opposite directions from a coupler body 88. The heads 86 are undercut between the body 88 and each of the heads 86 to form opposed engaging surfaces on the inner sides of the heads 86. The heads 86 also fit within the slots 76 in one orientation. The heads 86 have a convex surface for easier placement in the associated slots 76. Once rotated, the head provides good tension loading. These types of connections currently exist in the Intermodal system environment and can take shear as well as tension loads.

The couplers 84 may be formed such that the heads 86 are on a shaft rotatable within the body 88. A collar 90 is separated from each of the heads 86 by substantially the thickness of the walls of the formed boxes 76 with the collar 90 being of sufficient diameter that the collar 90 cannot fit within the slots 78. The collar 90 also provides access once the heads 86 are positioned in the slots 78 for rotation of the heads 86 into a locked orientation with the slots 78. The body 88 is of sufficient size and includes flat sides 92 such that it is prevented from rotating by the floor 32. Once the head 86 have been properly located, a rotation handle 94 that will allow rotation of the head 86 into the locking position and remain in that position during flight. The same mechanisms are employed between attachments 74 on adjacent containers 70.

The mounts 123 may correspond to the attachments 74 and employ the same mechanisms as shown in FIG. 10. Identical slots 78 in the floor 32 or the restraining flanges 33 may cooperate with the slots 78 in the containers 105 and couplers 84 to restrain the containers and integrate the structures thereof with the spine structure 120.

Figure 11:
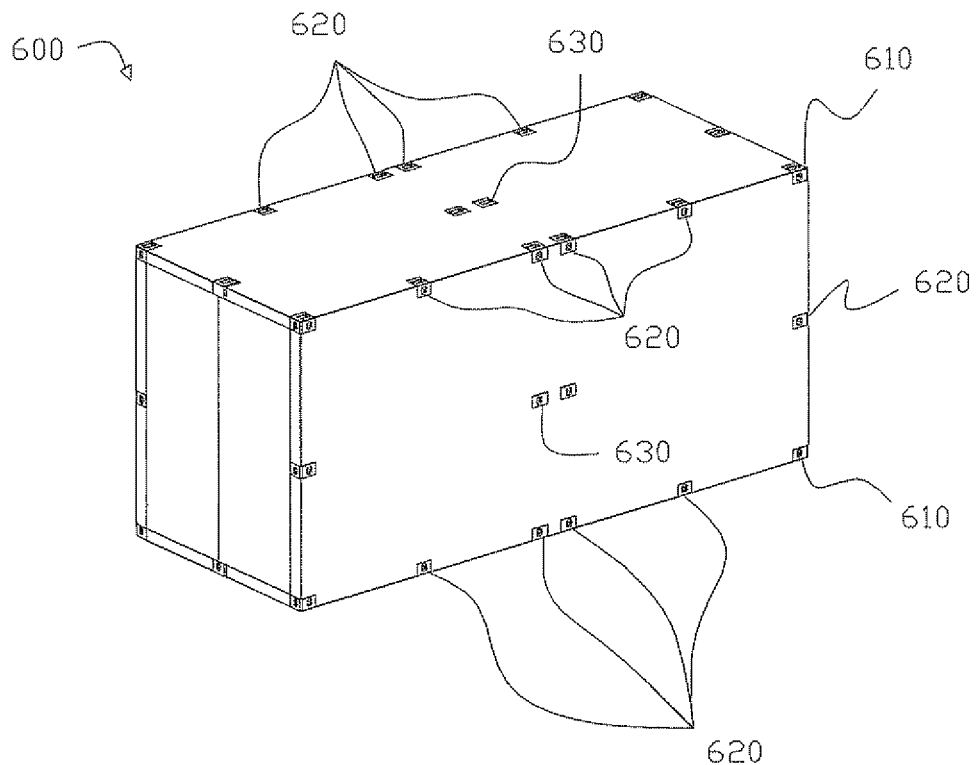
FIG. 11 is a perspective view of a modular cargo container comprising multiple points of attachment to the spine.

The effectiveness with which the cargo assembly is able to share in the aerodynamic load with the spine and the wings depends on the efficient distribution of this load onto the individual cargo containers. The efficient distribution of this load, in turn, depends on the extent to which the cargo containers are structurally integrated with one another. The extent of this integration may be augmented by increasing the number of attachment points between the cargo containers. FIG. 11 depicts a cargo container 600 which comprises multiple attachment points via corner attachments 610, side attachments 620 and panel attachments 630. These attachments may be used to structural integrate the cargo container 600 with either the aircraft spine or to other cargo containers or frame assemblies of like or different sizes.

The modular design of the frame assemblies and the cargo containers allows great flexibility in assembling a cargo assembly that is mounted onto the aircraft spine. For example, a cargo assembly may comprise: (a) only structural frame assemblies which, in turn, are comprised of structural frame elements of various shapes and sizes; (b) only cargo containers of various shapes and sizes or (c) combinations of (a) and (b). Where the cargo assembly is comprised of combinations of structural frame assemblies and cargo containers, any number of configurations and arrangements are possible. Additional fittings may be provided as required by higher weight cargo.

Figure 12A:
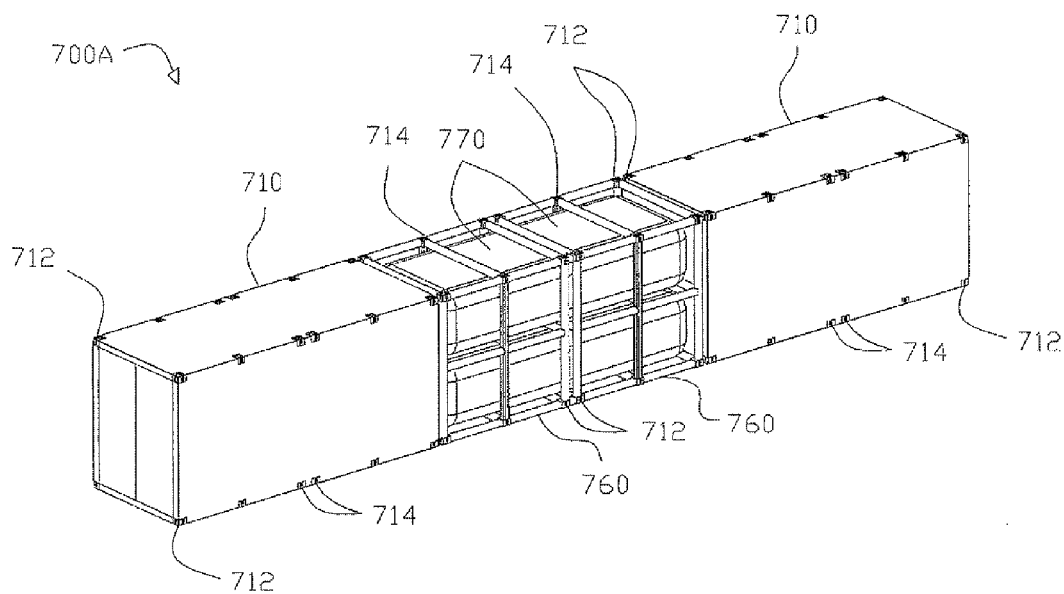
FIGS. 12A-12B are perspective views of modular frame units and modular container units coupled together in different configurations.
Figure 12B:
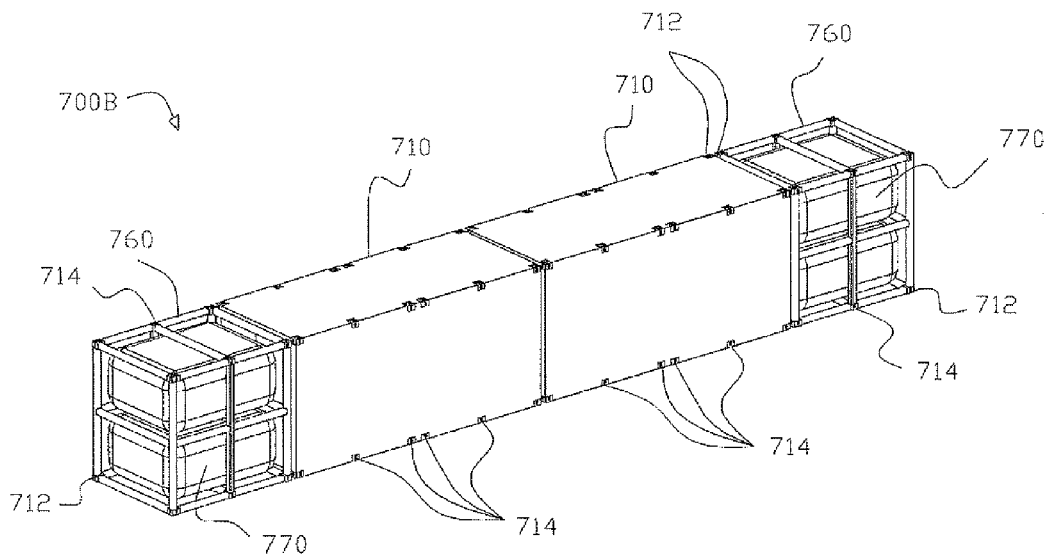

FIGS. 12A-B depict cargo assemblies 700A, 700B comprising both cargo containers 710 and structural frame assemblies 760. The cargo containers 710 and structural frame assemblies 760 each comprise a plurality of corner attachments 712 and side attachments 714. In the embodiment depicted in FIGS. 12A-B, the frame assemblies 760 are used to carry bladders 770. The bladders 770 may be used to carry a liquid or even additional fuel for the cargo aircraft. In embodiments where the bladder 770 is used to carry fuel, a supply conduit may be provided between the bladder 770 and the aircraft engine. Because such fuel transfers will change the weight distribution of the cargo assembly and thus the center of gravity of the aircraft, the arrangement shown in FIG. 12A is preferred, wherein the bladders 770 are located at the aircraft's center of gravity.

Under certain circumstances, it may be desirable to have a dynamic system for adjusting an aircraft's center of gravity. This may be desirable in situations where there are changes in the weight distribution of the aircraft during flight. In such embodiments, the cargo assembly of FIG. 12B may further comprise a conduit connecting the front and aft bladders 770 and liquid may be distributed therebetween to achieve the desired center of gravity. The conduit may be controlled by a central computer either onboard the aircraft or at a remote central command station to transport a desired volume of fluid to achieve the desired center of gravity.

It is understood that the modular units comprising the final cargo assembly is preferably arranged and distributed within the cargo assembly based on obtaining a center of gravity of the aircraft within a range acceptable for flight. Thus, the modular units having the highest maximum cargo loads may be arranged at or near the center of gravity of the unloaded aircraft. The entire contents of U.S. patent application Ser. No. 11/935,328, published under 2009/0114773, is incorporated herein by reference in its entirety.

In preferred embodiments of the cargo assembly, the modular frame and container units are mated and attached together in a manner that they act as a single assembly to share the flight load with the spine and wings. To that end, it is desirable to maximize the number and area of attachment points between the modular frame and container units. At the very least, the modular units are connected to one another via corner fittings. Preferably, however, the modular units are connected to one another via additional fittings and assemblies.

FIGS. 13 through 15 depict means by which adjacent modular container and frame units may be connected to effectuate a more efficient and distributed load transfer, thereby providing a structurally integrated cargo assembly.

Figure 13A:
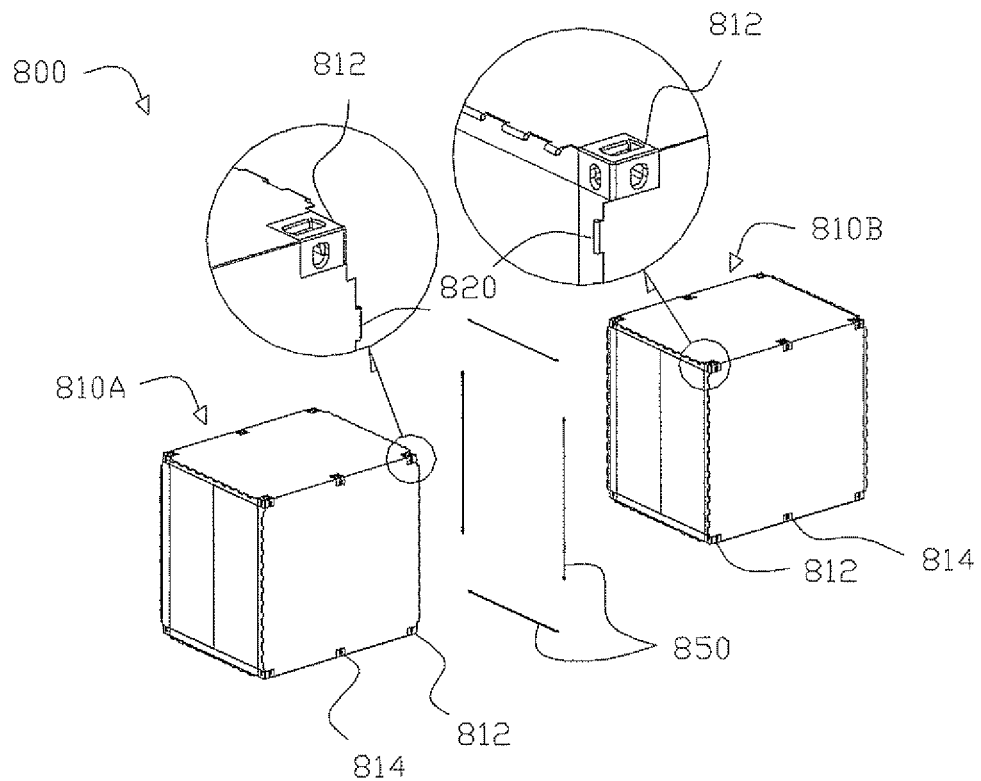
FIGS. 13A-13B are perspective views of modular container units featuring interconnecting hinge assemblies.
Figure 13B:
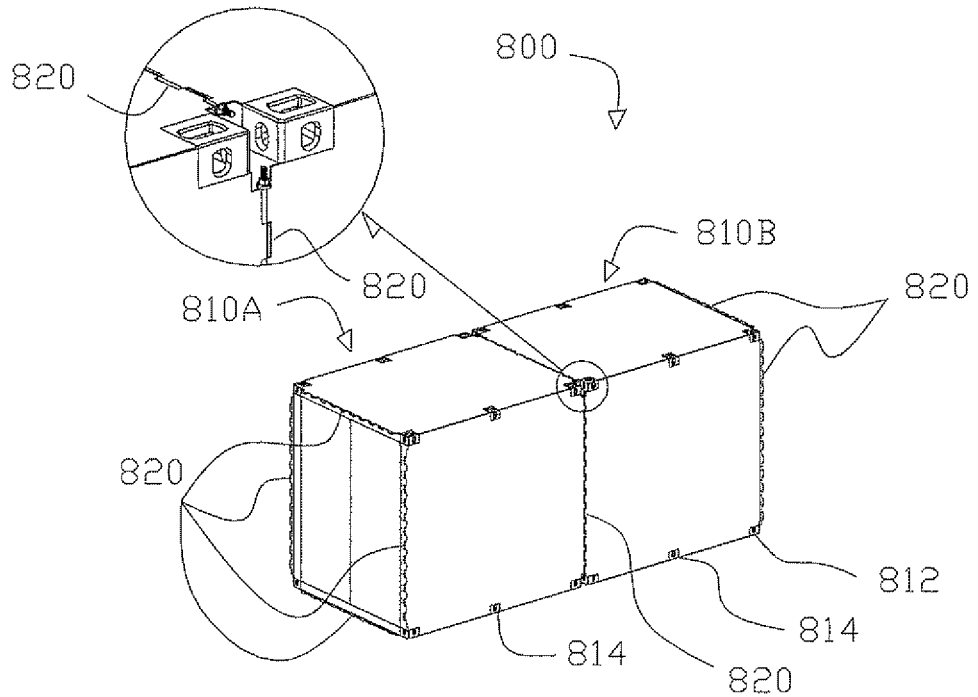

FIGS. 13A-B depict a connecting hinge assembly 800 to provide a further means of structurally coupling individual cargo containers 810A, 810B to enable a more efficient load transfer between adjacent modular units. The connecting hinge assembly 800 comprises a plurality of raised tubes 820 configured to interlock adjacent modular units 810A, 810B. Each one of the raised tubes 820 are configured to accommodate a rod 850 which is threaded through raised tubes 820 of adjoining cargo containers 810A, 810B to structurally couple the cargo containers 810A, 810B along its edges. The connecting hinge assembly 800 increases the contact points between adjacent modular units, resulting in a more efficient and distributed load transfer between the adjacent modular units.

Tensioning wires or rods may further be provided with the cargo assembly. FIGS. 14A-14D depict a tension assembly 950 that may be used in connection with the modular frame and container units disclosed herein. As shown in FIGS. 14A-14D, each modular unit may comprise one or more tension assemblies 950. The tension assembly 950 may be included in the modular units to further assure that loads are transferred when a bulkhead is not present. The rods or cables stabilize the cargo assembly structure by transmitting loads across a face of the container to which it would otherwise not be transmitted in the absence of the rods or cables.

Figure 14A:
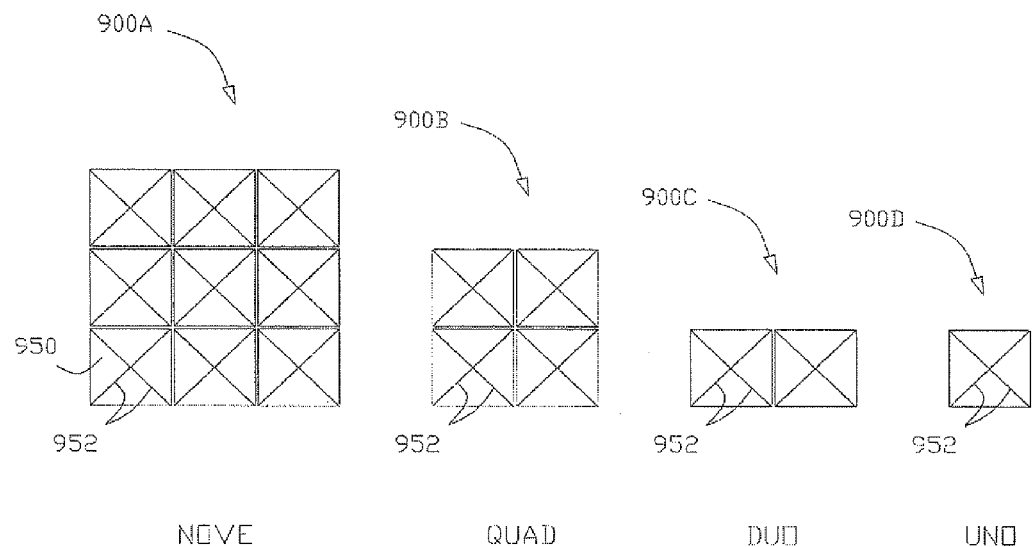
FIGS. 14A-14D depict tensioning systems that may be used in connection with the modular frame and container units.

The tension assembly 950 facilitates the transfer of load across the cargo assembly which, as shown in FIG. 14A, may comprise multiple modular units coupled together (900A, 900B, 900C) or a single cargo unit (900D). It is understood that the tension assembly 950 may be provided at various locations within the cargo unit including the sidewalls.

Figure 14B:
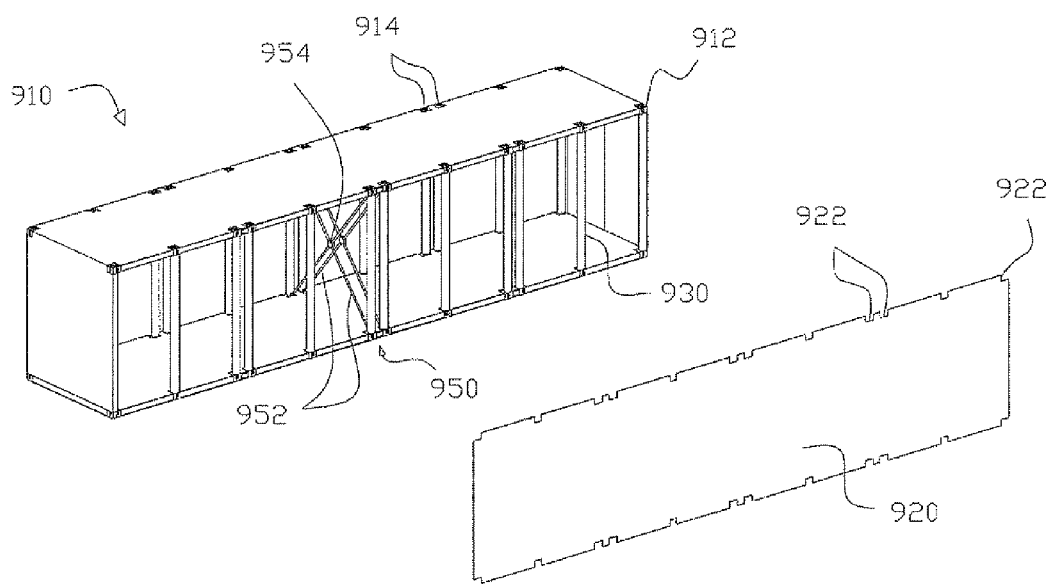

FIG. 14B shows a cargo container 910 comprising frame members 930 and a tension assembly 950 disposed in the middle of the cargo unit 910. The cargo container 910 further comprises eight corner attachments 912 and a plurality of side attachments 914. Fairings 920 are coupled to the frame members 930 to enclose the internal cavity of the cargo unit 910. The fairings 920 further comprise cutouts 922 to expose the corner attachments 912 and the side attachments 914 when the fairing 920 is coupled to the frame members 930.

Figure 14C:
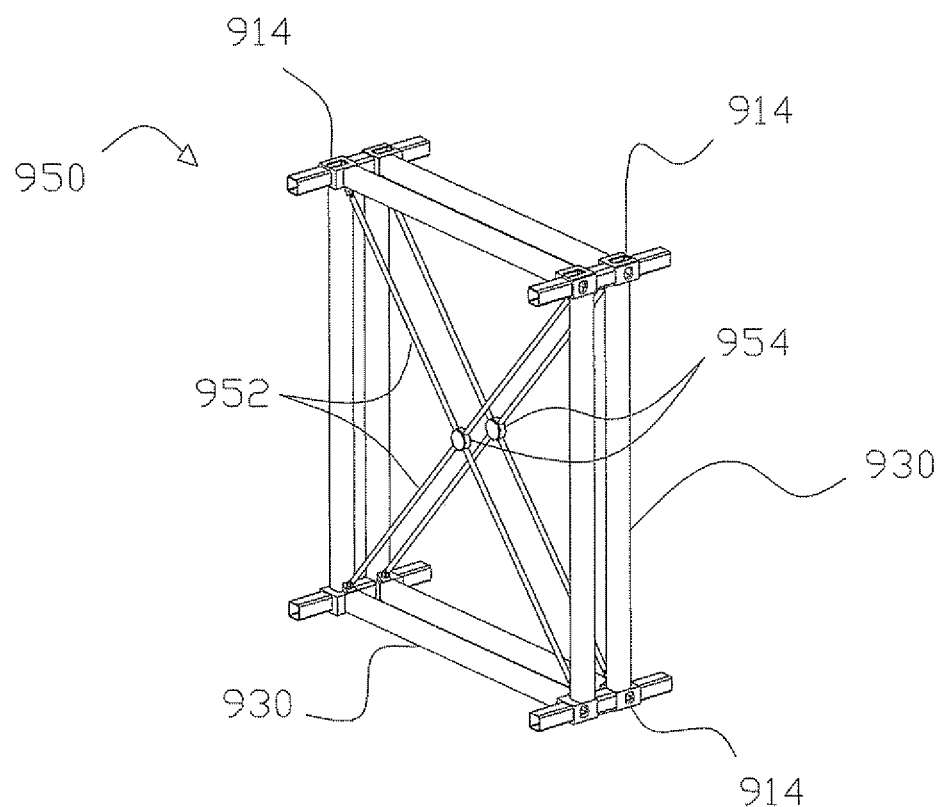
Figure 14D:
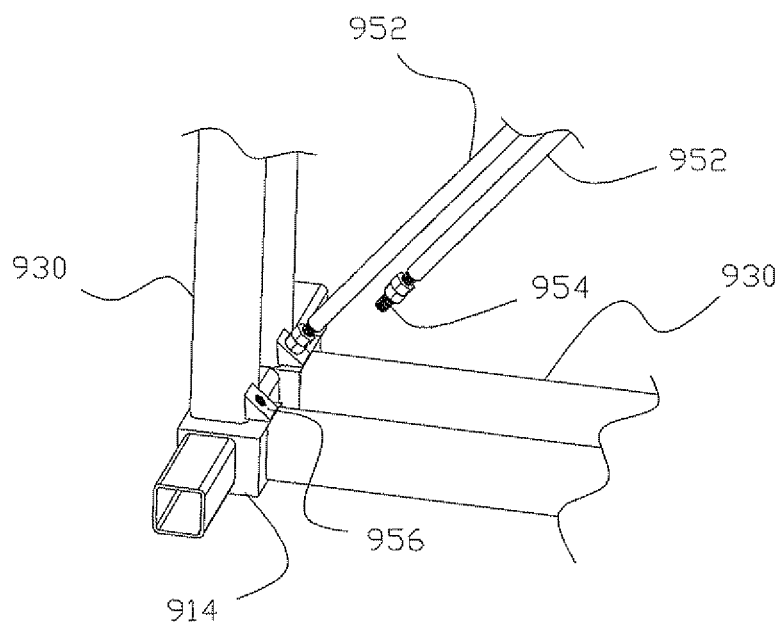

FIGS. 14C-D show an embodiment of the tension assembly 950 in greater detail. The tension assembly 950 comprises a pair of diagonally intersecting rods 952 that couple opposing corners defined by the frame members 930 of the cargo unit. The diagonally intersecting rods 952 intersect through a stabilizing hub 954. The ends of the rods 952 each comprise a threaded portion 954 which is inserted into an anchoring corner sheath 956 attached to the four corners defined by the frame members 930. The tension exerted by the tension assembly 950 may be increased by turning the rods 952 in one direction and may be decreased by turning the rods 952 in the opposite direction. In some embodiments, the center stabilizing feature may not be needed.

Splices may optionally be provided along the sides of the cargo assembly that is not attached to the spine. The splices may provide additional structural support and help transfer the load between cargo containers in the cargo assembly.

Figure 15A:
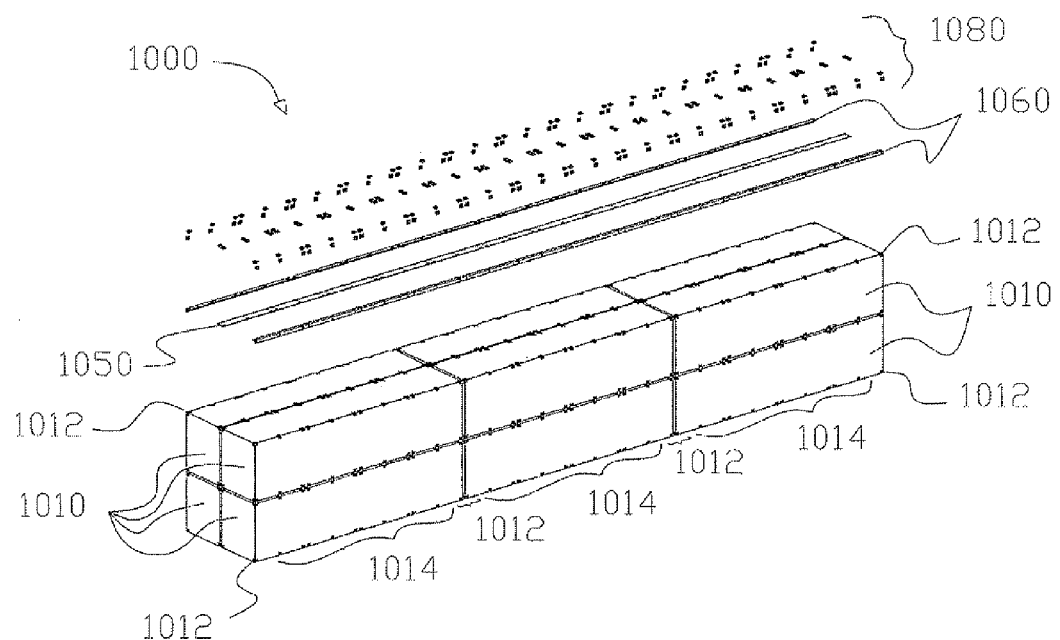
FIGS. 15A-15B depict a splicing system coupled to a cargo assembly to provide additional structural support.
Figure 15B:
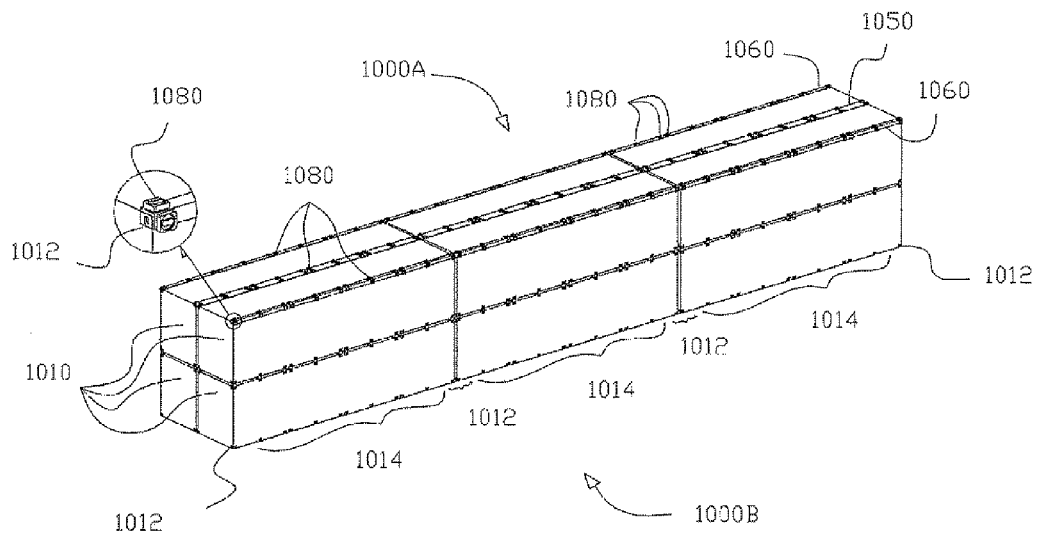

FIG. 15A-15B depict a cargo assembly 1000 comprising a plurality of cargo containers 1010. The cargo containers 1010 are coupled to one another via facing corner attachments 1012 and optionally via facing side attachments 1014 via couplers (not shown). Corner splices 1060 may be attached along the length of the corner edge of the cargo assembly 1000 via a plurality of splice bolts 1080. The splice bolts 1080 each further comprise an attachment face 1012 which structurally connect the splice to the container assembly. A center splice 1050 may further be attached along the length of the two facing corner edges of the cargo containers 1010 in the same manner. It is also understood that the splices 1050, 1060 may be attached at any location along the container assembly via a threaded screw.

While FIGS. 15A-15B depict the center splice 1050 and corner splices 1060 as extending the entire length of the cargo assembly, it is understood that the splices may extend only a portion of this length. The splices augment the structural rigidity of the cargo assembly 1000 and reinforce the connection and the load transfer between the individual cargo containers 1010. Additional splices may added off-center or on the vertical walls or even perpendicular to the long axis of the spine. Alternatively, cables could be used with fittings at the ends to tie them to the container assembly.

It is to be understood that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. An aircraft for transporting a plurality of cargo containers comprising:
 a forward fairing;
 an empennage;
 a spine disposed between the forward fairing and the empennage; and
 a cargo assembly configured to be structurally and detachably integrated with the spine, the cargo assembly comprising a plurality of cargo containers of the same or of different sizes, the plurality of cargo containers each comprising a plurality of attachment points to structurally integrate adjacent cargo containers to one another to provide rigidity to the resulting cargo assembly;
 wherein the spine has a lightweight structure such that the aircraft has sufficient rigidity to withstand bending and tortional loads in flight when unloaded with the cargo assembly;
 wherein the spine has insufficient rigidity to itself withstand bending and tortional loads in flight when loaded with the cargo assembly; and
 wherein the cargo assembly provides additional rigidity to the spine required for the aircraft to fully withstand bending and tortional loads in flight when the cargo assembly is structurally integrated with the spine.

2. The aircraft of claim 1, wherein the cargo assembly is comprised of any one or a combination of modular structural frames and cargo containers.

3. The aircraft of claim 1, further comprising one or more trusses coupling the cargo assembly to the spine.

4. The aircraft of claim 1, further comprising fairings to enclose the cargo assembly mounted on the spine.

5. The aircraft of claim 1, further comprising mounts to detachably engage and structurally couple the cargo assembly to the spine.

6. The aircraft of claim 5, wherein the mounts are disposed on the underside of the spine to detachably suspend the cargo assembly therefrom.

7. The aircraft of claim 6, wherein the mounts are actuated between a first and second position, wherein in the first position, the mounts structurally engage the cargo assembly to the spine and wherein in the second position, the mounts disengage and therefore release the cargo assembly from the spine.

8. The aircraft of claim 7, further comprising a control to alternatively actuate the mounts between the first and second positions.

\* \* \* \* \*